United States Patent
Kaden et al.

(10) Patent No.: US 9,441,593 B2
(45) Date of Patent: Sep. 13, 2016

(54) FUEL INJECTION SYSTEM OF AN INTERNAL COMBUSTION ENGINE

(71) Applicant: DAIMLER AG, Stuttgart (DE)

(72) Inventors: Arnold Kaden, Remshalden (DE); Guenter Karl, Esslingen (DE); Klaus Roessler, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 14/658,182

(22) Filed: Mar. 14, 2015

(65) Prior Publication Data

US 2015/0204292 A1  Jul. 23, 2015

Related U.S. Application Data

(63) Continuation-in-part of application No. PCT/EP2013/002786, filed on Sep. 14, 2013.

(30) Foreign Application Priority Data

Sep. 22, 2012  (DE) .................. 10 2012 018 780

(51) Int. Cl.
| | |
|---|---|
| *F02M 61/18* | (2006.01) |
| *F02M 69/04* | (2006.01) |
| *F02M 61/14* | (2006.01) |
| F02B 23/10 | (2006.01) |

(52) U.S. Cl.
CPC ........ *F02M 61/1813* (2013.01); *F02B 23/101* (2013.01); *F02M 61/14* (2013.01); *F02M 61/1853* (2013.01); *F02M 69/045* (2013.01); *F02B 2023/103* (2013.01); *F02B 2023/106* (2013.01); *F02M 61/1846* (2013.01); *Y02T 10/125* (2013.01)

(58) Field of Classification Search
CPC ............. F02M 61/1813; F02M 61/14; F02M 61/1846; F02B 23/101
See application file for complete search history.

(56) References Cited

U.S. PATENT DOCUMENTS

| | | | |
|---|---|---|---|
| 7,334,563 B2 | 2/2008 | Mifuji | |
| 2008/0196691 A1* | 8/2008 | Kihara | F02B 23/104 123/299 |
| 2010/0320293 A1* | 12/2010 | Ogura | F02M 61/1846 239/533.12 |
| 2012/0085316 A1* | 4/2012 | Chen | F02M 61/1826 123/298 |

FOREIGN PATENT DOCUMENTS

| | | |
|---|---|---|
| DE | 10 2006 037413 A1 | 2/2008 |
| DE | 10 2009 046 001 A1 | 4/2010 |
| DE | 10 2011 118 299 A1 | 11/2011 |
| DE | 10 2011 016 234 A1 | 10/2012 |
| JP | 2007-138779 | 6/2007 |
| JP | 2010-053710 | 3/2010 |
| WO | WO 2013/068121 A1 | 5/2013 |

* cited by examiner

*Primary Examiner* — Lindsay Low
*Assistant Examiner* — Kevin Lathers
(74) *Attorney, Agent, or Firm* — Klaus J. Bach

(57) ABSTRACT

In a fuel injection system of an internal combustion engine, having a combustion chamber with at least one intake valve at an intake side and with at least one exhaust valve at an exhaust side of the combustion chamber and a central injection nozzle for injecting fuel into the combustion chamber, the injection nozzle has injection orifices which are designed and oriented in such a way that a first quantity of fuel is injected into the intake side, a second quantity of fuel injected is into the exhaust side, and a third quantity of fuel which is about equal to the first quantity and greater than the second quantity is injected into a boundary area between the intake and the exhaust sides, providing for a low-emission operation of the internal combustion engine.

6 Claims, 1 Drawing Sheet

FUEL INJECTION SYSTEM OF AN INTERNAL COMBUSTION ENGINE

This is a Continuation-In-Part application of pending international patent application PCT/EP2013/002786 filed 2013 Sep. 14 and claiming the priority of German patent application 10 2012 018 780.7 filed 2012 Sep. 22.

BACKGROUND OF THE INVENTION

The invention relates to a fuel injection system of an internal combustion engine, and an internal combustion engine having such a fuel injection system.

In gasoline engines with direct fuel injection, the aim is to achieve the best possible distribution of the fuel in the combustion chamber and efficient, low-emission combustion of the fuel-air mixture in a so-called homogeneous operation of the internal combustion engine by means of the injection nozzles. For this purpose, in conventional fuel injection systems, injectors in the form of injection nozzles are usually used which open inwardly and generate a conical spray. Such injection nozzles customarily have five to seven injection orifices. To achieve good atomization of the fuel, the fuel may be injected into the combustion chamber with a fuel pressure of up to 20 MPa by way of the injection nozzle. However, wetting of the walls of the combustion chamber and the surfaces of the cylinder head and piston of the internal combustion engine, but also of the intake valves, with liquid fuel may result in undesirable increased pollutant emissions of the internal combustion engine, and therefore should be avoided to the greatest extent possible.

To avoid such undesirable wetting, it is important to control the interaction of the injected fuel spray with the internal flow of the air mass which is introduced into the cylinder. For example, internal combustion engines which are supercharged by means of an exhaust gas turbocharger often have a higher air mass motion in the form of a so-called "tumble flow," thus increasing the influence of the distribution of the injected fuel. For internal combustion engines having a centered arrangement of the injection nozzle on the cylinder, the air mass motion guides the injected fuel to an exhaust side of the combustion chamber, as the result of which increased fuel concentrations may develop at that location, and undesirable wetting of the walls of the combustion chamber by fuel may occur.

DE 10 2009 046 001 A1 discloses a fuel injection system of an internal combustion engine having a combustion chamber with at least one intake valve on an intake side and with at least one exhaust valve on an exhaust side and with a central injection nozzle for injecting fuel into the combustion chamber. The injection nozzle has six injection orifices, a first partial quantity of fuel being injectable at the intake side by means of two first injection orifices and a second partial quantity of fuel being injectable at the exhaust side by means of four second injection orifices. Flow channels to the injection orifices have a respectively different design, so that the flow channels of the two first injection orifices have a higher flow resistance than the flow channels of the four second injection orifices. Contact of the cylinder walls with fuel may thus be reduced due to a shortened length of the injection jets of the two first injection orifices. However, contact of the cylinder walls with fuel by the injection jets of the four second injection orifices cannot be excluded.

DE 198 04 463 A1 describes a fuel injection system for gasoline engines, having an injection nozzle which injects fuel into a combustion chamber that is formed by a piston-cylinder structure. The combustion chamber has a spark plug which protrudes into the combustion chamber. The injection nozzle is situated in the central area of the combustion chamber, and is provided with at least one row of injection orifices which are distributed over the periphery of the injection nozzle, so that, by means of a targeted injection of fuel through the injection orifices, a spray-guided combustion process may be achieved by forming a mixture cloud. According to this combustion process, at least one fuel jet is generated, which for the ignition is directed at least approximately in the direction of the spark plug and controlled in such a way that only vaporized fuel is present in the area of contact with the spark plug. Together with additional fuel jets, at least one approximately closed and/or cohesive mixture cloud is formed, wherein no significant contact of the other jets with the piston or the cylinder wall of the internal combustion engine occurs.

It is the principal object of the present invention to provide an improved design for a fuel injection system in which the above-mentioned disadvantages are eliminated or at least reduced.

SUMMARY OF THE INVENTION

The invention is based on the general concept of configuring the injection nozzle with at least two injection orifices in such a way that a quantity of fuel injected into/on an exhaust side of the combustion chamber is less than a quantity of fuel injected into/on the intake side of the combustion chamber.

In a fuel injection system of an internal combustion engine, having a combustion chamber with at least one intake valve at an intake side and with at least one exhaust valve at an exhaust side of the combustion chamber and a central injection nozzle for injecting fuel into the combustion chamber, the injection nozzle has injection orifices which are designed and oriented in such a way that a first quantity of fuel is injected into the intake side, a second quantity of fuel injected is into the exhaust side, and a third quantity of fuel which is about equal to the first quantity and greater than the second quantity is injected into a boundary area between the intake and the exhaust sides, providing for a low-emission operation of the internal combustion engine.

The intake side and exhaust side are defined essentially via the respective position of the intake and exhaust valves. Since, due to an air mass flow in the direction of the exhaust side which is intensified in the vicinity of the injection nozzle, fuel injected into this area may undesirably reach the wall of the combustion chamber particularly quickly, and at that location may bring about the above-mentioned undesirable effects, the reduction according to the invention of the quantity of fuel injected into the exhaust side results in decreased undesirable wetting of the walls of the combustion chamber. In the ideal case, such undesirable wetting with fuel may even be completely avoided. In particular, increased pollutant emissions may be avoided in this way.

The at least one injection orifice for the intake side preferably has a first opening diameter which is larger than a second opening diameter of the at least one injection orifice for the exhaust side. The reduction according to the invention of the quantity of injected fuel in the area of the exhaust side compared to the intake side may thus be achieved in a technically simple manner.

One embodiment is particularly preferred according to which an opening diameter of an injection orifice is between 100 μm and 250 μm.

To ensure particularly low-emission combustion of fuel which is injected into the combustion chamber, in one refining embodiment the injection nozzle may be designed in such a way that fuel which is injected into the combustion chamber does not strike either a combustion chamber wall or a piston of the internal combustion engine.

For particularly effective combustion of the fuel which is injected into the combustion chamber, in one refining embodiment, the injection orifices may be arranged in such a way that a fuel jet having a conical spray geometry is generated, the fuel jet having an opening angle of essentially 80°.

In one preferred embodiment, undesirable wetting of the walls of the combustion chamber may be avoided in that the injection nozzle is situated on an axis of the combustion chamber and/or the injection nozzle is situated at an angle of $0° \leq \phi \leq 20°$ with respect to the axis of the combustion chamber.

In an embodiment which is particularly suitable for operating a motor vehicle, the injection nozzle may have six injection orifices, a first partial quantity of fuel being injectable at the intake side by means of two injection orifices, a second partial quantity of fuel being injectable at the exhaust side by means of two further injection orifices, and a third partial quantity of fuel being injectable into a boundary area between the intake side and the exhaust side which extends in the axial direction. According to this embodiment, the second partial quantity of fuel is less than the first and the third partial quantity of fuel in each case. In a particular embodiment, which is particularly easy to implement technically, the first partial quantity of fuel is essentially equal to the third partial quantity of fuel.

In an embodiment which is particularly fuel-efficient, the first partial quantity of fuel may be approximately 42%, the second partial quantity of fuel may be approximately 18%, and the third partial quantity of fuel may be approximately 40%, of the overall quantity of fuel introduced. A particularly favorable mixture formation with high efficiency and avoidance of wetting of the cylinder wall may be achieved in this way.

The length of at least one injection orifice may preferably be approximately 200 μm. In this way, fuel may be injected into the combustion chamber in a particularly effective manner.

The invention further relates to an internal combustion engine having a fuel injection system with one or more of the above-mentioned features.

Important features and advantages of the invention will become more readily apparent from the following description with reference to the accompanying drawings.

It is understood that the features stated above as well as features explained below may be used not only in the particular stated combination, but also in other combinations or alone without departing from the scope of the present invention.

Preferred exemplary embodiments of the invention are illustrated in the drawings and explained in greater detail below with identical, similar, or functionally equivalent components being denoted by the same reference numerals.

DESCRIPTION OF PARTICULAR EMBODIMENTS

Figure 1:
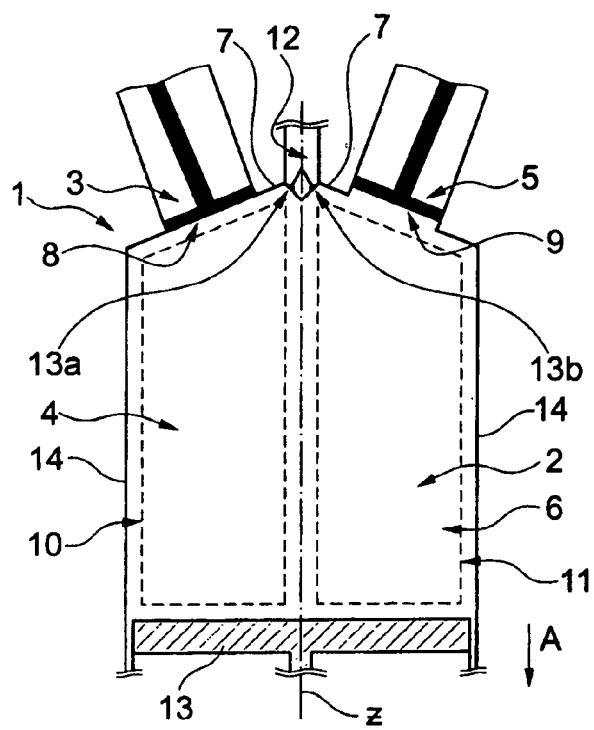
FIG. 1 shows a longitudinal section of a fuel injection system according to the invention in the area of a combustion chamber.

The illustration in FIG. 1 shows a longitudinal section of a cylinder of a fuel injection system according to the invention of an internal combustion engine, depicted in a roughly schematic manner and denoted by reference numeral 1. The fuel injection system 1 includes a combustion chamber 2 having an intake valve 3 on an intake side 4 of the combustion chamber 2, and an exhaust valve 5 on an exhaust side 6 of the combustion chamber 2. A piston 13 which is movable up and down is situated in the combustion chamber 2. The combustion chamber 2 customarily has a cylindrical design, and is delimited by the cylinder head forming an end face 7. The cylinder head includes intake valve receiving opening 8 and an exhaust valve receiving opening 9 which are closed by the intake valve 3 and the exhaust valve 5, respectively.

From the intake side 4 and the exhaust side 6, volume areas 10, 11 (see dashed lines in FIG. 1) of the combustion chamber 2 extend away from the intake valve receiving opening 8 and exhaust valve receiving opening 9, respectively, in an axial direction A. According to the invention, the fuel injection system 1 includes a central injection nozzle 12 for injecting fuel into the combustion chamber 2, the central injection nozzle being situated essentially centrally on the end face 7 of the combustion chamber 2. The injection nozzle 12 is preferably situated on a (center) axis Z of the combustion chamber 2 which extends in the axial direction A. However, in a variant not shown in FIG. 1 for the sake of clarity, the injection nozzle 12 may also be inclined at an angle of 0° to 20° with respect to the axis Z.

The injection nozzle 12 has at least two injection orifices 13a, 13b, the length of at least one of the two injection orifices 13a, 13b being approximately 200 μm. In variants, of course, a different number of injection orifices may be provided. The two injection orifices 13a, 13b are situated in the injection nozzle 12 in such a way that a quantity of fuel that is injected on the exhaust side 6, in particular into the area 11, is less than a quantity of fuel that is injected on the intake side 4, in particular into the area 10. Such a distribution may be achieved by a suitable arrangement of the injection orifices 13a, 13b on the injection nozzle 12, as schematically shown in FIG. 1.

By means of a suitable geometric configuration of the first injection orifice 13a, the fuel injected from the injection orifice 13a into the combustion chamber 2 is injected essentially into area 10 (intake side 4), whereas the fuel injected via the injection orifice 13b into the combustion chamber 2 is injected primarily into area 11 (exhaust side 6).

By a suitable selection of the opening diameters da, db of the two injection orifices 13a, 13b, respectively, it is now possible for a larger relative portion of the overall fuel that is injected into the combustion chamber 2 to be injected into area 10 (intake side 4) than into area 11 (exhaust side 6). To achieve this, the opening diameter da may be larger than the opening diameter db. The opening diameters of the injection orifices 13a, 13b may preferably have values in the range of 100 μm to 250 μm. Of course, the design of the orifices 13a, 13b discussed above is to be regarded only as an example.

In variants, it may also be considered in principle to provide injection orifices 13a, 13b with identical opening diameters, wherein the injection according to the invention, in which the quantity of fuel injected on the exhaust side is less than the quantity of fuel injected on the intake side 4, is achieved solely due to a suitable arrangement or orientation of the injection orifices 13a, 13b. Of course, in further variants of the exemplary embodiment, a different number of injection orifices 13a, 13b may also be provided in order to achieve the injection of fuel according to the invention. For example, in one variant of the exemplary embodiment it may be considered to provide a total of five injection orifices in the injection nozzle 12, fuel being injected on the intake side 4 via three of these five injection orifices, and fuel being injected on the exhaust side 6 via the remaining two injection orifices.

The injection nozzle 12 and in particular its injection orifices 13a, 13b are preferably designed in such a way that fuel which is injected into the combustion chamber 2 does not strike either a combustion chamber wall 14 (in particular in the area of the exhaust side 6) of the combustion chamber 2, or the piston 13.

Figure 2:
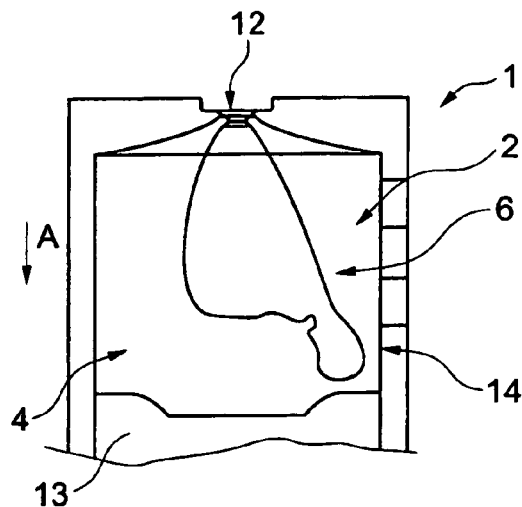
FIG. 2 shows a fuel distribution in a combustion chamber of the fuel injection system in FIG. 1, and FIGS. 3A and 3B show variants of FIG. 1.

FIG. 2 shows a fuel distribution of fuel which is injected into the combustion chamber 2 by means of the fuel injection system 1 according to the invention. It is immediately apparent from FIG. 2 that no fuel strikes the combustion chamber wall 14, so that this wall is not undesirably wetted with fuel. The same applies for the piston 13 of the internal combustion engine shown in FIG. 2.

Figure 3A:
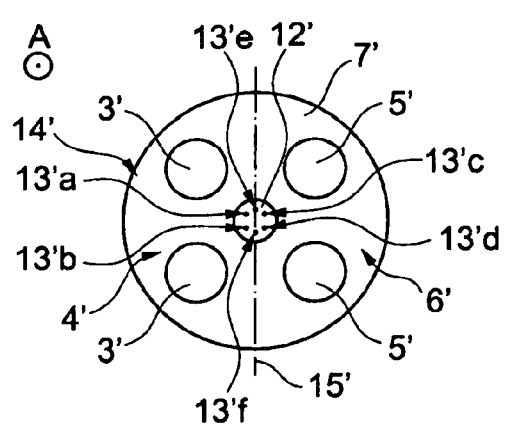
Figure 3B:
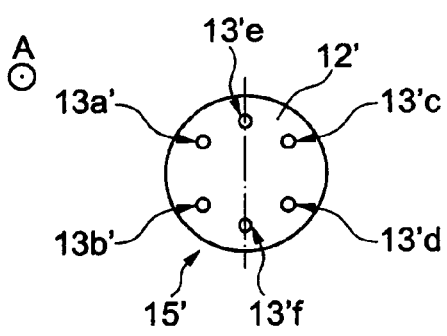

FIG. 3a shows a variant of the fuel injection system 1', having two intake valves 3' and two exhaust valves 5', and an injection nozzle 12' which has six injection orifices 13'a, 13'b, 13'c, 13'd, 13'e, 13'f. FIG. 3a shows the end face 7' in a top view from inside the combustion chamber 2. FIG. 3b shows an enlarged view of the injection nozzle 12'. The injection nozzle 12' has six injection orifices 13'a through 13'f, whereby a first partial quantity of fuel is injected at the intake side 4' by means of two injection orifices 13'a, 13'b, while a second partial quantity of fuel is injected at the exhaust side 6' by means of two further injection orifices 13'c, 13'd, and a third partial quantity of fuel is injected into a boundary area 15' between the intake side 4' and the exhaust side 6', which boundary area 15' extends in the axial direction A, by means of two injection orifices 13'e, 13'f. According to this variant, the second partial quantity of fuel is less than the first and the third partial quantity of fuel in each case; thus, the first partial quantity of fuel may be approximately 42%, the second partial quantity of fuel may be approximately 18%, and the third partial quantity of fuel may be approximately 40%, of the overall quantity of fuel introduced. Alternatively, the first partial quantity of fuel may be essentially equal to the third partial quantity of fuel.

When more than two injection orifices are used, such as the injection nozzle 12' having six injection orifices 13'a, 13'b, 13'c, 13'd, 13'e, 13'f in FIGS. 3a and 3b, the injection orifices are situated in such a way that they generate a fuel jet having a conical spray geometry, the fuel jet having an opening angle of essentially 80°.

What is claimed is:

1. A fuel injection system (1') of an internal combustion engine with a combustion chamber (2) having at least one intake valve (3') at an intake side (4') and at feast one exhaust valve (5') at an exhaust side (6') and a central fuel injection nozzle (12') for injecting fuel into the combustion chamber (2), the fuel injection nozzle (12') having six injection orifices (13'a, 13'b, 13'c, 13'd, 13'e, 13'f), comprising:
   a first set of two injection orifices (13'a, 13'b) oriented for first partial quantity of fuel into the cylinder at the intake side (4')
   a second set of two injection orifices (13'c, 13'd) oriented for injecting a second partial quantity of fuel into the cylinder at the exhaust side (6') and
   a third set of two injection orifices (13'e, 13'f) oriented for injecting a third partial quantity of fuel into a boundary area (15') between the intake side (4') and the exhaust side (6') which boundary area (15') extends in the axial direction of the cylinder,
   wherein the first partial quantity of fuel is equal to the third partial quantity of fuel and greater than the second partial quantity of fuel.

2. The fuel injection system (1') according to claim 1, wherein the central fuel injection nozzle (12') is designed in such a way that fuel which is injected into the combustion chamber (2) does not strike a combustion chamber wall (14') nor a piston (13).

3. The fuel injection system (1') according to claim 1, wherein the injection orifices (13'a, 13'b, 13'c, 13'd, 13'e, 13'f) of the central fuel injection nozzle are oriented in such a way that a fuel jet with a conical spray geometry having an opening angle of 80° is generated.

4. The fuel injection system (1') according to claim 1, wherein the angle between the central fuel injection nozzle (12') and the axis (Z) of the combustion chamber (2) is between 0° and 20°.

5. The fuel injection system (1') according to claim 1, wherein at least one of the injection orifices (13'a, 13'b, 13'c, 13'd, 13'e, 13'f) has a length of approximately 200 μm.

6. A fuel injection system (1') of an internal combustion engine with a combustion chamber (2) having at least one intake valve (3') at an intake side (4') and at least one exhaust valve (5') at an exhaust side (6') and a central fuel injection nozzle (12') for injecting fuel into the combustion chamber (2), the fuel injection nozzle (12') having six injection orifices (13'a, 13'b, 13'c, 13'd, 13'e, 13'f), comprising:
   a first set of two injection orifices (13'a, 13'b) oriented for injecting first partial quantity of fuel into the cylinder at the intake side (4')
   a second set of two injection orifices (13'c, 13'd) oriented for injecting a second partial quantity of fuel into the cylinder at the exhaust side (6') and
   a third set of two injection orifices (13'e, 13'f) oriented for injecting a third partial quantity of fuel into a boundary area (15') between the intake side (4') and the exhaust side (6') which boundary area (15') extends in the axial direction of the cylinder,
   wherein the first partial quantity of fuel is 42%, the second partial quantity of fuel is 18% and the third partial quantity of fuel is 40% of the overall quantity of fuel introduced.

* * * * *